(12) United States Patent
Rasche et al.

(10) Patent No.: US 11,584,470 B2
(45) Date of Patent: Feb. 21, 2023

(54) CARGO BIKE TRANSPORT CARRIER

(71) Applicant: RTI Sports GmbH, Koblenz (DE)

(72) Inventors: Johannes Rasche, Darmstadt (DE); Franc Arnold, Koblenz (DE); Arndt Graeve, Koblenz (DE)

(73) Assignee: RTI Sports GmbH, Koblenz (DE)

( * ) Notice: Subject to any disclaimer, the term of this patent is extended or adjusted under 35 U.S.C. 154(b) by 110 days.

(21) Appl. No.: 17/008,817

(22) Filed: Sep. 1, 2020

(65) Prior Publication Data

US 2021/0061398 A1    Mar. 4, 2021

(30) Foreign Application Priority Data

Sep. 2, 2019  (DE) ..................... 20 2019 104 809.3

(51) Int. Cl.
*B62K 7/04*     (2006.01)
*B62J 9/22*     (2020.01)

(52) U.S. Cl.
CPC .. *B62K 7/04* (2013.01); *B62J 9/22* (2020.02)

(58) Field of Classification Search
CPC ....... B62K 7/04; B62J 9/22; B62J 9/10; B62J 9/20; B62J 9/21
USPC .......................................................... 280/202
See application file for complete search history.

(56) References Cited

U.S. PATENT DOCUMENTS

| | | | |
|---|---|---|---|
| 4,367,829 A * | 1/1983 | Kusz ........................ | B62J 7/04 297/215.11 |
| 4,813,583 A * | 3/1989 | Carpenter ................. | B62J 7/00 224/452 |
| 8,167,181 B2 * | 5/2012 | Kaczkowski ............. | B62J 9/20 220/675 |

FOREIGN PATENT DOCUMENTS

| | | |
|---|---|---|
| DE | 8320019 U1 | 12/1983 |
| DE | 202015102839 U1 | 10/2016 |
| EP | 3290315 B1 | 2/2020 |
| FR | 653361 A | 3/1929 |
| JP | 2004122876 A | 4/2004 |
| JP | 2007276673 A | 10/2007 |

OTHER PUBLICATIONS

FAIß, Michael, Cube Cargo Hybrid und Cube Compact Hybrid: Die Urban Mobility Offensive, Aug. 14, 2019, https://www.velomotion.de/magazin/2019/08/cube-cargo-compact-e-bike/.
Cadeau, Xavier, [Test] Douze Cycles G4e Box, le biporteur qui augmente le volume, WEELZ, Jul. 11, 2012, https://www.weelz.fr/fr/test-douze-cycles-g4-box-biporteur-velo-cargo/.
Urban Arrow Family Manual, Mar. 2017, Version UAF-FM2017EN-0001, The Netherlands.
FAIß, Michael, "Cube Cargo Hybrid und Cube Compact Hybrid: Die Urban Mobility Offensive" Velomotion, Aug. 14, 2019, https://www.velomotion.de/magazin/2019/08/cube-cargo-compact-e-bike/.

* cited by examiner

*Primary Examiner* — Kevin Hurley
*Assistant Examiner* — Felicia L. Brittman
(74) *Attorney, Agent, or Firm* — The Webb Law Firm (57) ABSTRACT

A cargo bike transport carrier for accommodating cargo includes a bottom element, two mutually opposite side walls, a rear wall and a front wall. To allow for an inexpensive and simple manufacture of the cargo bike transport carrier, according to a preferred embodiment, the latter is made up of two plastic parts each constituting half of the transport carrier, wherein the two halves are separated by a vertical parting plane.

20 Claims, 10 Drawing Sheets

Fig. 7

CARGO BIKE TRANSPORT CARRIER

CROSS-REFERENCE TO RELATED APPLICATION

This application claims priority to German Patent Application No. 20 2019 104 809.3 filed Sep. 2, 2019, the disclosure of which is hereby incorporated by reference in its entirety.

BACKGROUND OF THE INVENTION

Field of the Invention

The disclosure relates to a cargo bike transport carrier.

Description of Related Art

Cargo bikes suitable for transporting persons, in particular children, or cargo, comprise a corresponding transport box. Such cargo bike transport carriers are frequently configured as simple wooden boxes. In particular with regard to saving weight it is also known to produce such cargo bike boxes from plastic material.

It is an object of the disclosure to provide a cargo bike transport carrier of plastic material which is easy and inexpensive to produce.

According to the disclosure, the object is achieved with a cargo bike transport carrier.

SUMMARY OF THE INVENTION

The cargo bike transport carrier comprises a bottom element, two opposite side walls, a rear wall and a front wall. According to the invention, the cargo bike transport carrier is made from at least two plastic parts. Here, a first plastic part comprises at least one of the side walls and the second plastic part comprises at least the second side wall. The remaining components, e.g. the bottom element, the rear wall and the front wall, can be separate components. It is particularly preferred that at least one of the plastic parts, in particular two plastic parts, comprise, in addition to one of the side walls, at least a portion of the bottom element and/or a portion the rear wall and/or a portion of the front wall. In particular, these two plastic parts are configured such that a vertical parting is realized. A vertical parting in the mounted condition means that the parting plane between the plastic parts essentially extends vertically, wherein a plurality of parting planes can be provided when the cargo bike transport carrier is made up of a plurality of plastic parts and/or the parting plane can be made up of a plurality of vertical parting plane regions offset with respect to each other.

According to a particularly preferred embodiment, the plastic parts comprise a particle foam or are in particular made from particle foam. In particular, they are thermoplastic particle foams. For example, EPP (expandable polypropylene) is suitable. Alternatively, at least individual parts of the cargo bike transport carrier can be configured as injection molded plastic parts.

It is particularly preferred that the cargo bike transport carrier is essentially made up of only two plastic parts, e.g. in particular two halves. At least one of the two halves comprises, in addition to the side wall, at least portions of the bottom element, the rear wall and the front wall, wherein the second plastic part comprises a side wall or a side wall and at least a portion of the bottom element and/or the rear wall and/or the front wall. Here, it is particularly preferred that the two plastic parts, in addition to a side wall, each comprise a portion of the bottom element and a portion of the rear wall and a portion of the front wall. In particular, it is preferred that the two plastic parts configured as halves each also comprise half of the bottom element, the rear wall and the front wall. The parting plane between the two plastic parts configured as halves thus extends, in the mounted condition, as a vertical center surface.

In particular, it is preferred that the two plastic parts are not only configured as halves but are mirror-inverted or mirror-symmetrical to this vertical parting plane, wherein, here, the vertical parting plane is the plane between the two halves and not a mold parting plane of a two-part manufacturing mold. Such mold parting planes are additionally provided since the individual plastic parts must possibly be removed from the mold.

The preferred embodiment of the individual parts described above, in particular the halves of the plastic bike box made up of plastic parts, in particular offers the advantage that the individual parts can be easily removed from the mold. The required mold is considerably smaller than a mold in which the overall cargo bike transport carrier would be made from one plastic part.

Further, according to the embodiment of the disclosure, the cargo bike transport carrier made up of a plurality of parts, in particular two halves with a vertical parting plane, offers the advantage that in the individual parts recesses, deepened portions and the like can be provided in a simple manner without the mold for manufacturing the plastic part having to comprise complex sliders, lost cores and the like for producing undercuts.

It is particularly preferred that a direction for removing the plastic parts, in particular the two halves, from the mold extends vertically to the respective side wall and/or in parallel to the front wall and/or the rear wall and/or the bottom element. Thus it is possible to easily remove the plastic part from the mold and in particular not to produce any undercuts.

Preferably, on the inside of the side walls and/or on the outside of the side walls reinforcing ribs are provided. In the case of the preferred direction of removal from the mold and due to the configuration of the cargo bike transport carrier of in particular two vertically parted halves such reinforcing ribs or the like can be provided without any undercuts being produced. By providing such reinforcing ribs the rigidity can be improved and material can be saved and the weight can be reduced, respectively. Here, the reinforcing ribs can be configured such that they can serve as arm rests, holding elements for attachments, such as drinking bottles, storage compartments and the like, for example.

In addition to the reinforcing ribs, recesses open in the direction of removal from the mold can be easily formed on the inside and/or the outside of the side walls, but also in the front wall or the rear wall. In the bottom element, too, such recesses open in the direction of removal from the mold can be provided. They can also be provided in an open configuration on the inside of the bottom element such that the bottom element comprises grooves or ribs. They serve for reinforcement on the one hand, and can cause the bottom element not to be smooth on the inside on the other hand, such that transport goods do not shift.

According to a particularly preferred embodiment, the plastic parts, in particular the two halves of the cargo bike transport carrier, are connected via connecting elements. The connecting elements are preferably at least partially made of metal. Preferably, a connecting bracket arranged in particular in an upper region of the cargo bike transport carrier is provided. Here, it is preferred that this connecting bracket, like a brace, completely encloses or encompasses the cargo bike transport carrier. The connecting bracket can also be arranged inside the cargo bike transport carrier or in recesses or deepened portions of the cargo bike transport carrier. It is preferred that the connecting bracket is in particular closed and thus constitutes a rigid frame structure which holds together and connects the parts of the cargo bike transport carrier on the one hand, and allows for load absorption on the other hand. It is thus particularly preferred that a connection of the cargo bike transport carrier to the cargo bike is realized via the connecting elements and not via the plastic parts. Thereby, a reliable connection can be ensured.

Preferably, the connecting bracket comprises two bracket elements which are connected to each other via screws, locking elements and the like, for example. The connecting brackets preferable have a U-shape and extend along a side wall, wherein the central portion of the bracket extends along a side wall and the two bosses extend in the region of the front wall and the rear wall. The two bracket elements are connected in the region of the front wall and/or the rear wall, in particular in the center of these two walls. It is particularly preferred that the connection is realized in the region of the parting plane.

Preferably, the brackets are arranged in an upper region near an upper edge of the side walls, the rear wall and the front wall. In particular, the distance of the bracket elements to the upper edge is smaller than 10 cm, in particular smaller than 5 cm. In addition, it is preferred that the connecting bracket is arranged in recesses or openings such that it does in particular not protrude towards the outside of the cargo bike transport carrier.

In addition, it is preferred that at least one, in particular two connecting bars for connecting the individual plastic parts are provided. It is particularly preferred that two connecting bars are provided, wherein one connecting bar is arranged through an inside of the rear wall and the other connecting bar is arranged in the region of an inside of the front wall. Here, the two connecting bars can be configured such that they are arranged between the two opposite side walls and are fixed in and/or at the side walls. It is preferred that the in particular two connecting bars comprise bosses at their ends. Here, one boss can in particular be configured as a head fixedly connected to the bar, and the other boss can be configured as a releasable boss, e.g. a nut. In particular in this embodiment, bracing of the bar and thus the plastic parts is easily realizable. Here, the bosses are preferably arranged in the deepened portions of the side wall which are open towards the outside. These deepened portions can be closed by a cover.

In particular with the combination of a circumferential connecting bracket in the upper region of the cargo bike transport carrier and the two connecting bars in the lower region a good and stable connection of the cargo bike transport carrier can be realized. In particular, the load can be applied via the connecting elements, wherein it is particularly preferred that the cargo bike transport carrier is connected to the cargo bike via the connecting elements.

In recesses or openings provided in individual parts of the cargo bike transport carrier attachments can be arranged or connected to the cargo bike transport carrier in a simple manner. For example, a step element can be inserted into an in particular slot-shaped opening open to the outside. Thereby, climbing into the cargo bike transport carrier can be facilitated, in particular for children.

According to a preferred embodiment of the cargo bike transport carrier, the latter comprises a cover with the aid of which the upper side of the cargo bike transport carrier can preferably be completely closed. Here, it is preferred that the cover is pivotably, possibly via an intermediate element, connected to the connecting elements, in particular the connecting bracket arranged in the upper region. Thereby, forces produced when opening and closing the cover are essentially not transmitted to the plastic parts but to the connecting elements.

According to another preferred embodiment, the bottom element comprises an opening. This opening allows for access to a battery or the like in its mounted condition and arranged below the cargo bike transport carrier. This opening is preferably in particular hermetically closed by a cover.

Further, the disclosure relates to a cargo bike frame having a chain stay for accommodating a rear wheel, a fork element for accommodating a front wheel and a supporting element for accommodating the cargo bike transport carrier between the handlebar tube and the fork element. Here, the cargo bike transport carrier is configured in a particularly preferred embodiment as described above.

According to a preferred aspect, the cargo bike transport carrier, in its mounted condition, comprises a boss directed in the direction of travel. This boss extends at least partially beyond a fork element. At least, this boss extends beyond an upper region of the fork element. The boss of the first accommodation container made from a plastic material has a certain elasticity and deformability. Thus the boss serves as an impact protection such that in the case of an accident risks of injuries caused by the fork element, in particular the upper region of the fork element, is considerably reduced. Such a boss at a cargo accommodation container is an independent invention. This is in particular independent of the fact whether the cargo accommodation container has a vertical parting, is made from a plurality of elements or is of an integral configuration. The corresponding boss can further be connected to a cargo accommodation container. According to a preferred aspect, the cargo accommodation container is configured and/or further developed as described above.

BRIEF DESCRIPTION OF THE DRAWINGS

Hereunder the disclosure will be explained in detail on the basis of a preferred embodiment with reference to the accompanying drawings in which.

DESCRIPTION OF THE INVENTION

Figure 1A:
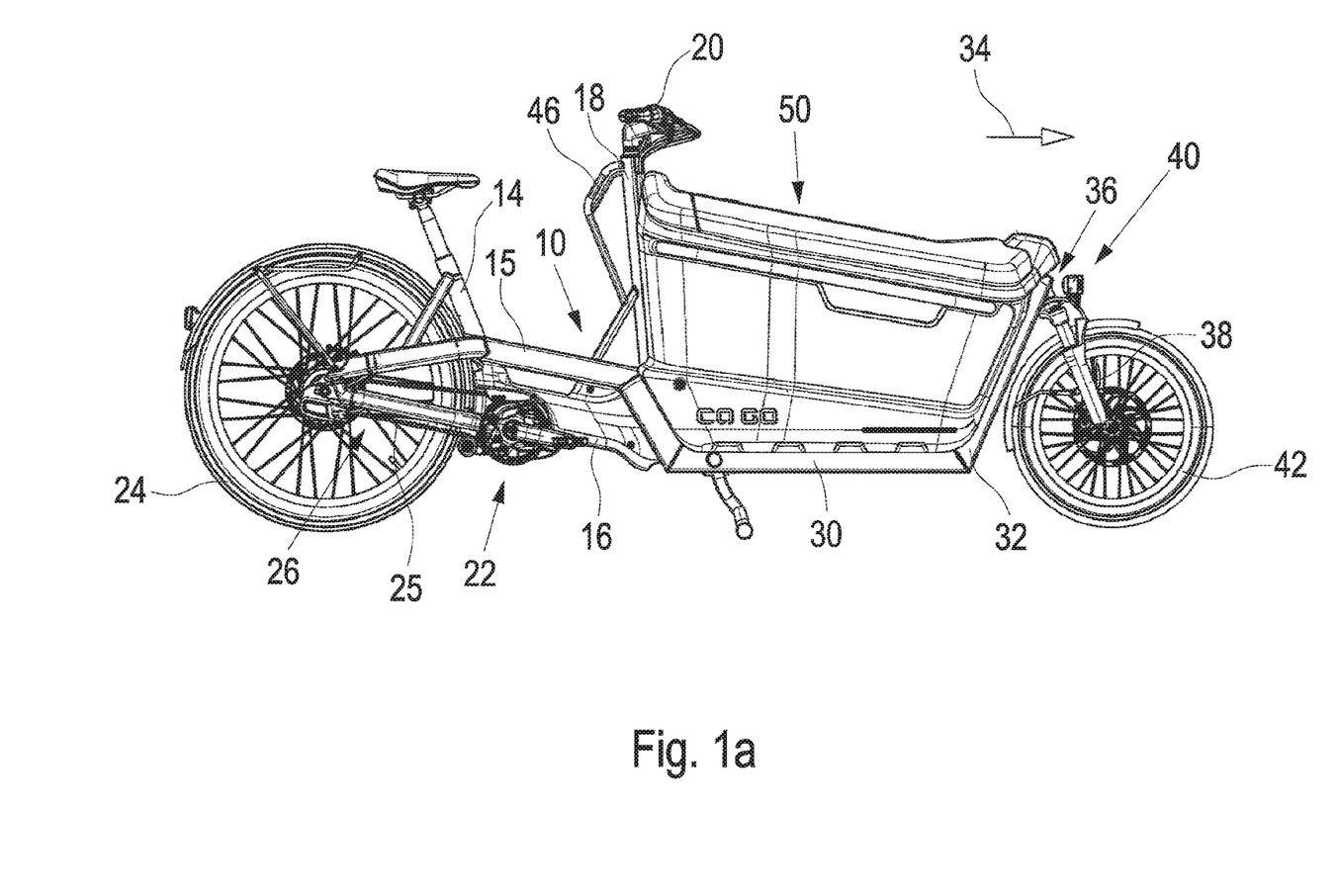
FIG. 1a shows a schematic side view of a cargo bike with a cargo accommodation container configured according to the disclosure.
Figure 1B:
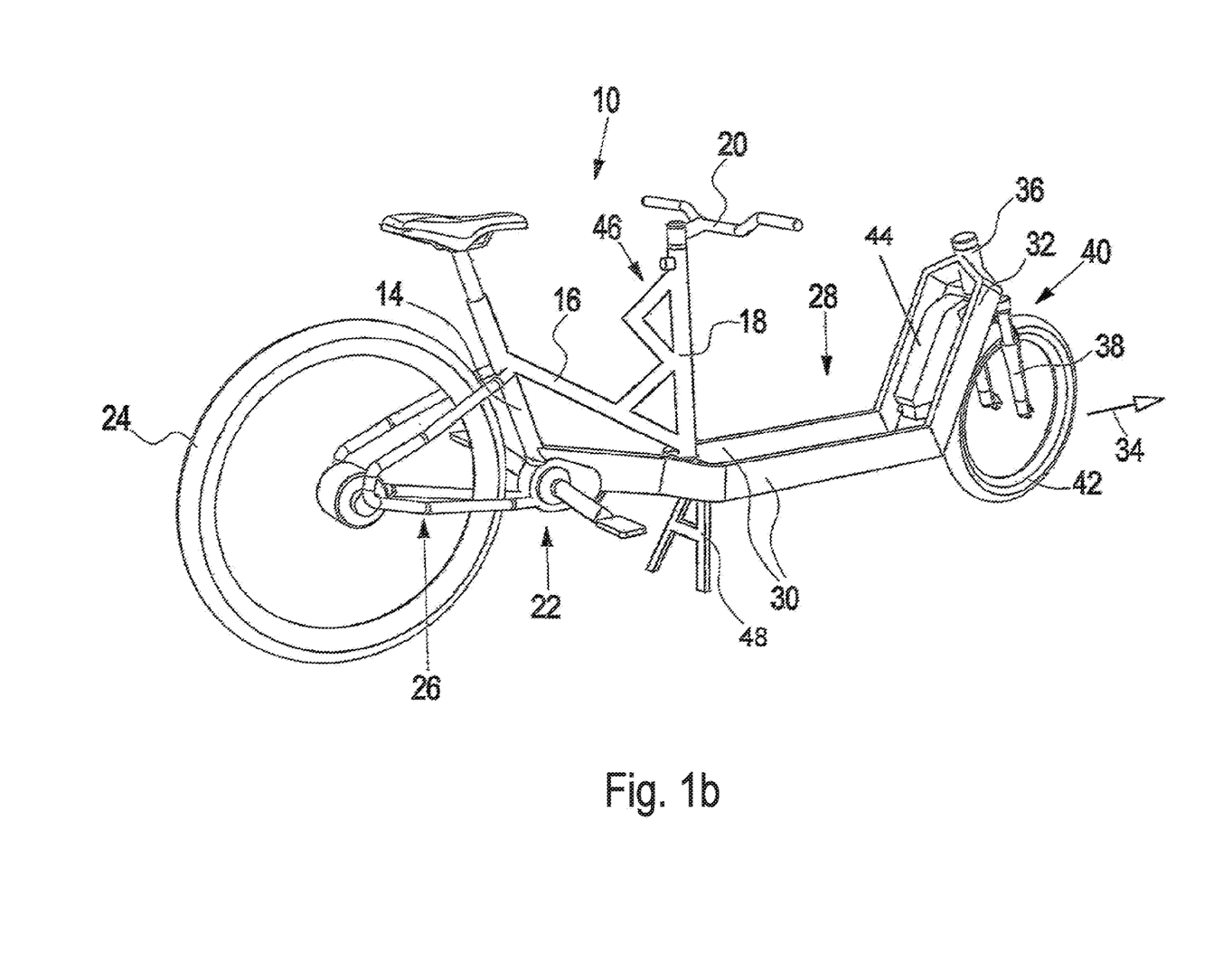
FIG. 1b shows a schematic perspective side view of a cargo bike without a cargo accommodation container.

A preferred embodiment of the cargo bike according to the disclosure as illustrated in FIGS. 1a-1b comprises a cargo bike frame 10. In the illustrated exemplary embodiment, the cargo bike frame 10 comprises a saddle tube 14, a top tube 15 and a down tube 16 covered by a covering as well as a handlebar tube 18. In the handlebar tube 18 a pivotable tube is arranged which is connected to the handlebar 20. Further, in the illustrated exemplary embodiment, a drive means 22 is arranged between the down tube 16 and the saddle tube 14. The drive means comprises a conventional bottom bracket which is connected to an electric motor so that pedaling can be supported by the electric motor. A rear wheel 24 is driven via a drive with the aid of a toothed belt 25 or the like. Further, the cargo bike frame 10 comprises a chain stay 26 supporting the rear wheel 24. In the illustrated exemplary embodiment, a single-track cargo bike is illustrated.

Further, the bike frame 10 comprises a supporting element 28. In the illustrated exemplary embodiment, the supporting element 28 comprises two horizontal frame elements 30 (FIG. 1b) which are connected to the down tube 16 as well as the handlebar tube 18. In the illustrated exemplary embodiment, the two horizontally extending frame elements 30 have connected thereto two fork elements 32 which extend upwards in the direction of travel 34. In the region of a fork steerer 36 they are connected to each other and to the former. The fork steerer 36 forms part of a fork element 40 also including the fork 38 and, in the illustrated exemplary embodiment, supporting a front wheel 42.

A battery 44 can be connected to the supporting element 28. In the illustrated exemplary embodiment, the battery 44 is arranged between the two fork elements 32 of the supporting element. Further, the battery 44 or another battery can be arranged between the two frame elements 30.

The handlebar tube 18 has connected thereto a grip element 46. In the illustrated exemplary embodiment, the grip element is arranged on a rear side of the handlebar tube 18 and is directed in the direction of the chain stay 26 and/or the direction of the saddle tube 14. Thus, the grip element 46 is arranged in the frame center plane in which, in the illustrated cargo bike, the two wheels as well as the saddle tube 14, the down tube 16 and the handlebar tube 18 are also arranged.

For lifting the cargo bike or to place it onto a main kickstand 48, for example, the user can in particular grip the upper portion of the grip element.

Figure 3:
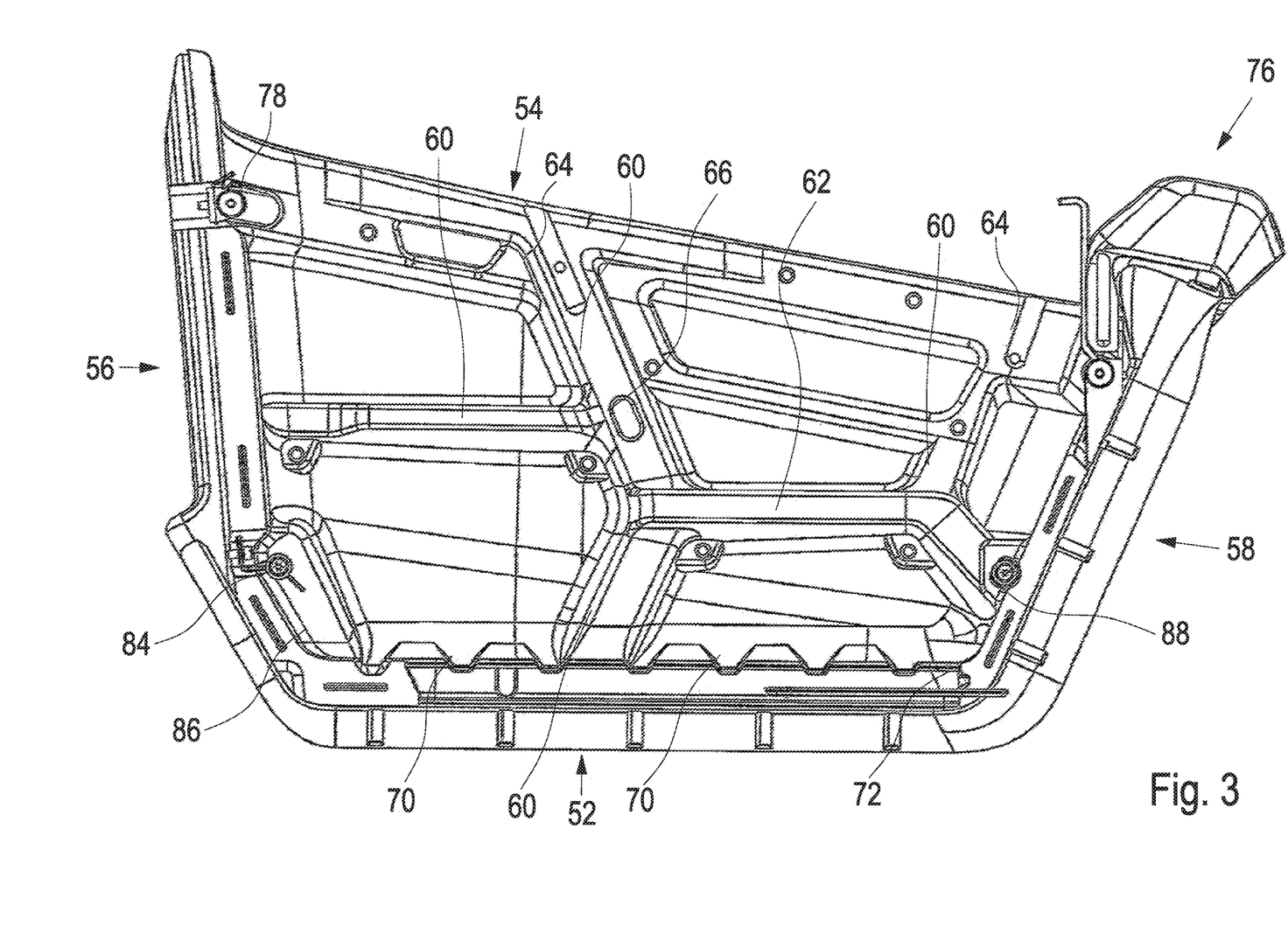
FIG. 3 shows a side view of one of the two halves of the cargo accommodation container illustrated in FIG. 1.

A cargo bike transport carrier 50 comprises a bottom element 52, two side elements 54, a rear wall 56 as well as a front wall 58. In the illustrated particularly preferred exemplary embodiment, the cargo bike transport carrier is essentially made up of two plastic parts, as illustrated in FIG. 3. The two plastic parts are of a mirror-inverted configuration relative to a vertical center plane which, in their assembled condition, corresponds to the bike center plane. Each of the two plastic part halves thus comprises a side wall 54, half a rear wall 56, half a front wall 58 and half a bottom element 52.

According to the disclosure, the direction of removal from the mold is perpendicular to the side wall 54, e.g. perpendicular to the drawing plane of FIG. 3. This offers the essential advantage that it is possible to provide in a simple manner reinforcing ribs 60 extending in the direction of removal from the mold, wherein individual reinforcing ribs 60, 62 can also be configured as rests, for example arm rests. The ribs 60 and 62 extend in the molding direction such that no undercuts are produced. Further, recesses 64, 66 can be provided in the ribs, said recesses being open towards the inside or in the direction of removal from the mold. Further, the slot-shaped recesses 64 are open on an upper side of the side wall 54 such that here rods of a hood can be inserted and adjusted. In the recess 66 a bottle holder, a holder for transport goods etc. can be attached.

In the illustrated exemplary embodiment, recesses 70 configured as grooves are provided in the bottom element 52, which recesses are arranged on an inside of the bottom element 52 and extend in the direction of removal from the mold. Thereby, the surface of the bottom element can be patterned thus improving the rigidity.

Further, an opening 72, half of which is shown in FIG. 3, is provided in the bottom element. The opening allows for access to a battery, which in the mounted condition is arranged between the two frame elements 30 of the bike frame 10, for maintenance or removal purposes, for example. The opening 72 is closed by a cover 74.

Further, in the front end region of the front wall 58 a boss 76 is provided. The latter covers an upper side of the fork steerer. The boss 76 extends beyond the upper region of the fork element in the direction of travel and serves as an impact protection, inter alia.

Figure 2:
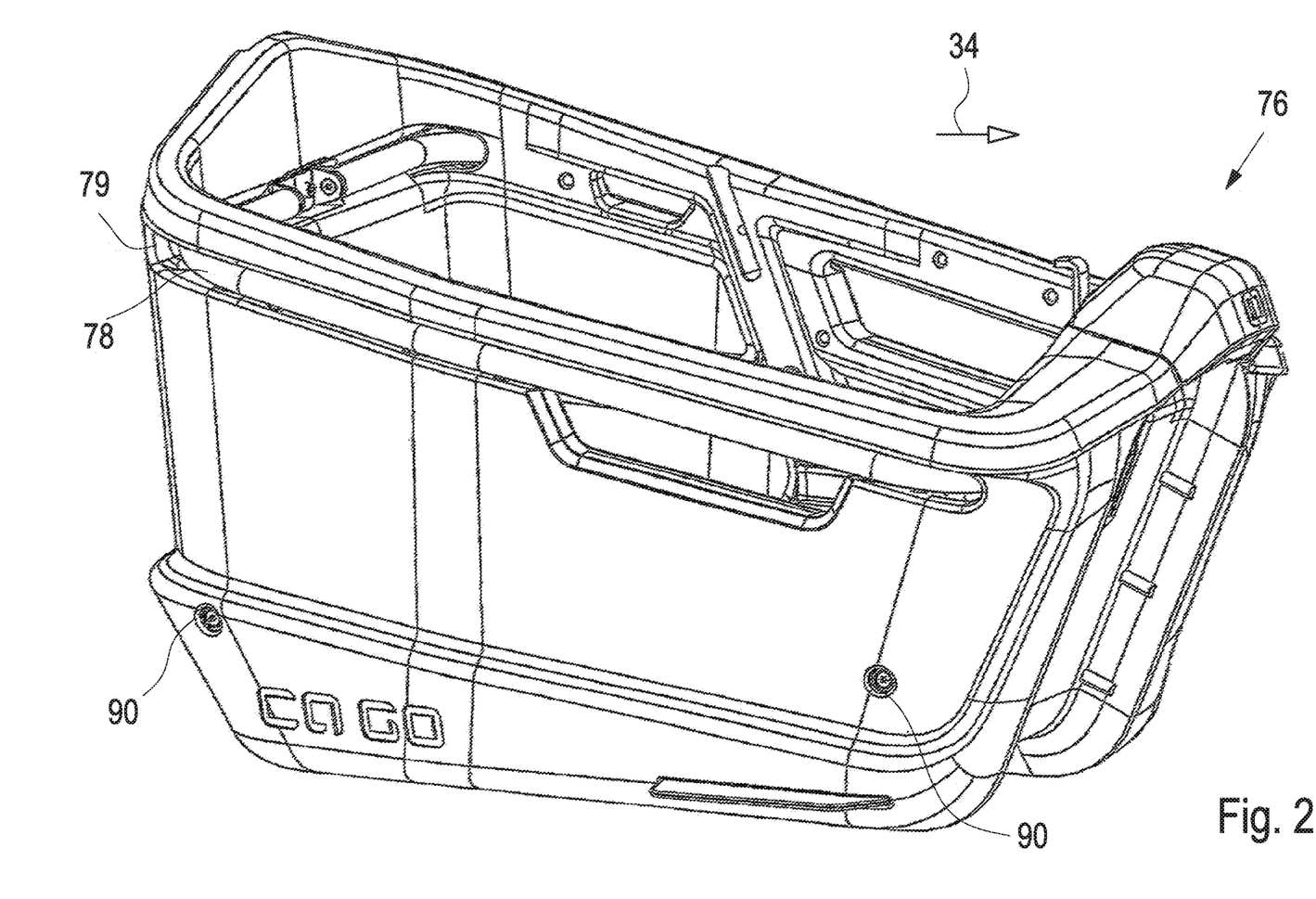
FIG. 2 shows a perspective side view of a first preferred embodiment of the cargo bike cargo accommodation container.

The two plastic halves illustrated in FIG. 3 are assembled to form the cargo bike transport carrier illustrated in FIG. 2. For fixing and/or connecting the two halves, a connecting bracket made up of two bracket elements 78 is provided in an upper region. The two bracket elements are connected to corresponding connecting elements in the region of the parting plane. The parting plane is the front side of half the rear wall 56 and/or half the front wall 58 as well as half the bottom element 52 illustrated in FIG. 3. The two bracket elements 78 are fixedly connected and/or braced to each other such that they form a clamp in the upper region of the cargo bike transport carrier.

Figure 6A:
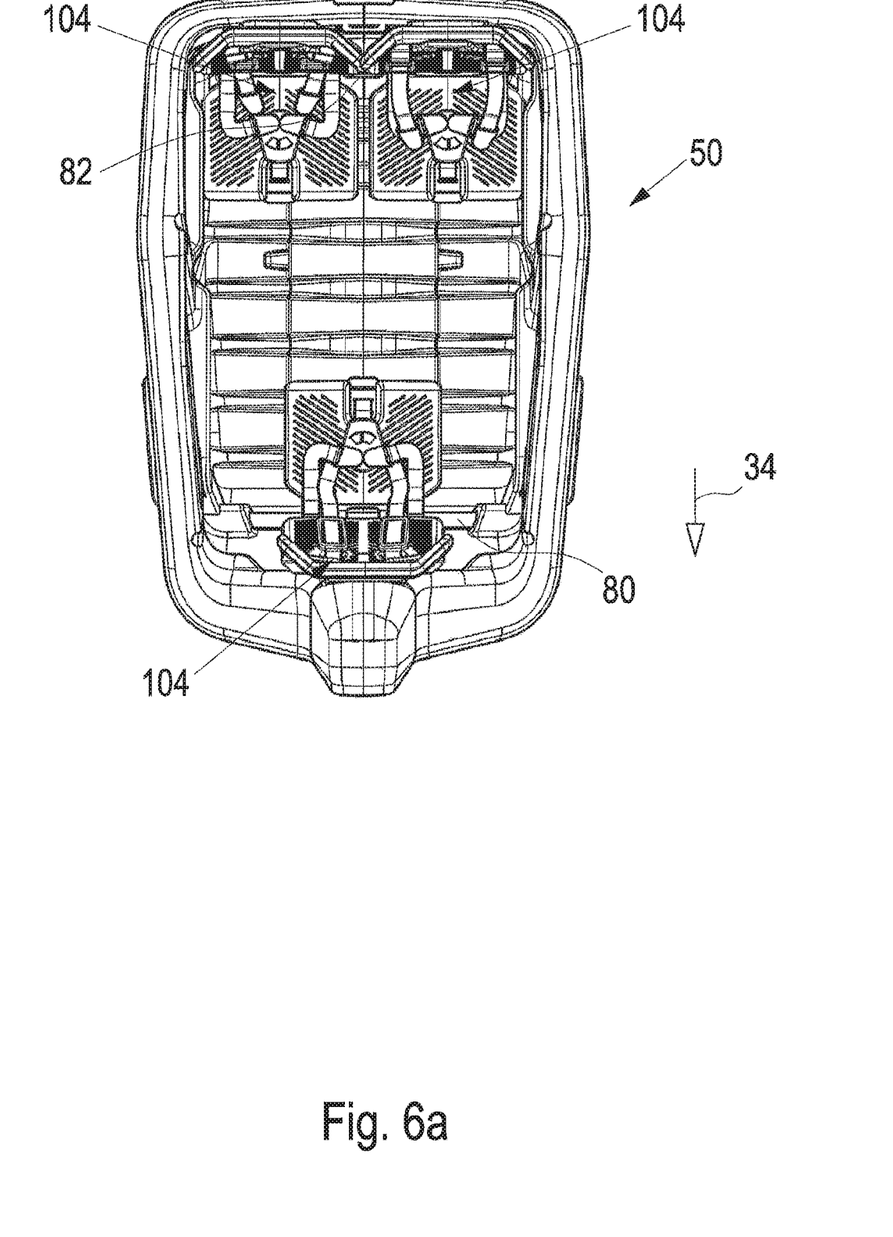
FIGS. 6a and 6b show a top perspective view of cargo accommodation container with and without integrated seats.
Figure 6B:
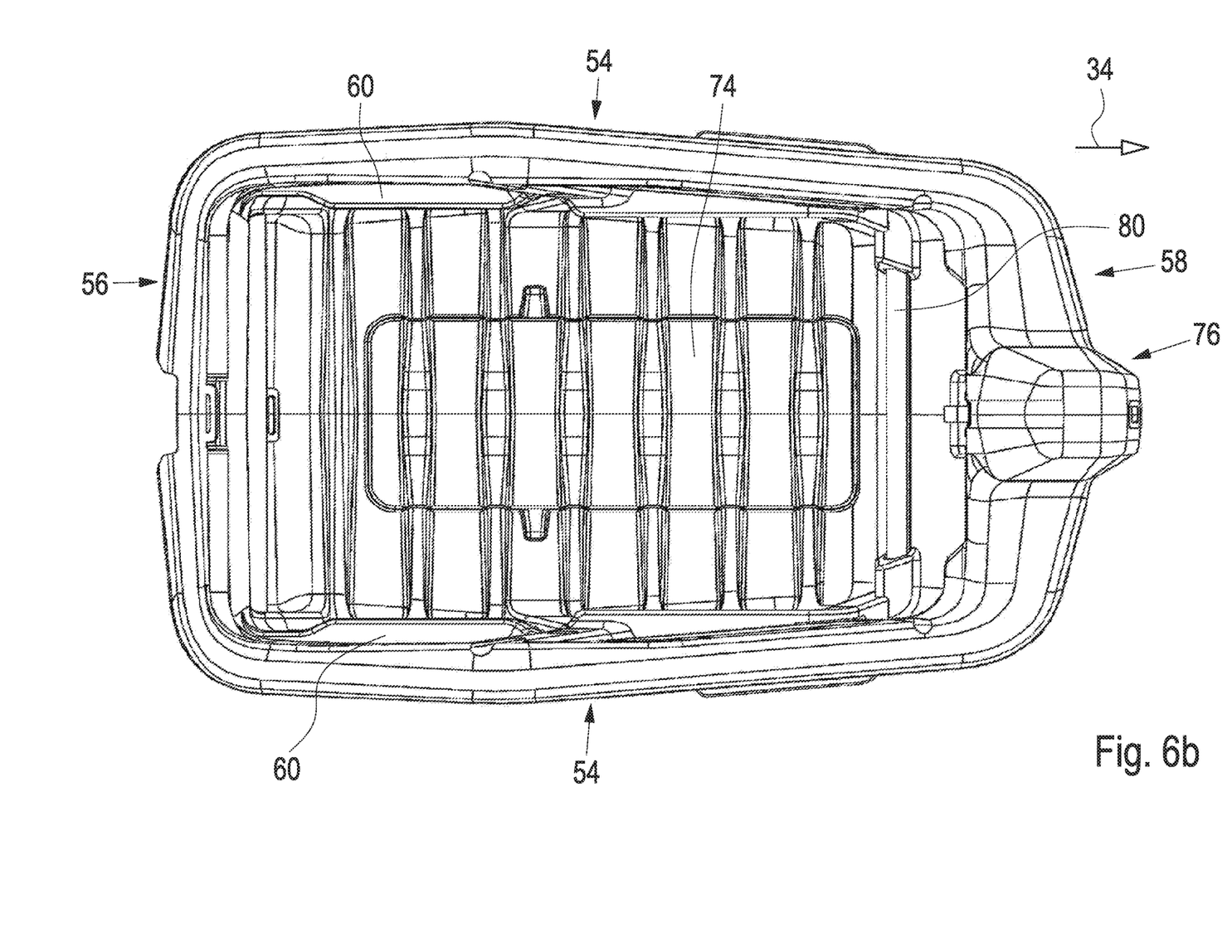

Further, for connecting the two halves two connecting bars 80, 82 (FIGS. 6a-6b) are provided. A connecting bar, which is a rear connecting bar as seen in the direction of travel 34, is arranged in a recess 84 (FIG. 3). The recess 84 is provided in an inwardly extending rib-shaped boss 86. On the opposite side, i.e. in the other plastic part half, the arrangement is the same. The front connecting bar 80 is arranged in a recess 88 (FIG. 3). For bracing the two halves of the cargo bike transport carrier, the connecting bars 80, 82 comprise a boss configured as a head on one side, for example, wherein on the other side of the bars a nut is screwed on. Likewise, the two connecting bars can have an internal thread such that fixing can be effected from the outside in particular by fixing elements 90 in particular configured as screws (FIG. 2).

Figure 4:
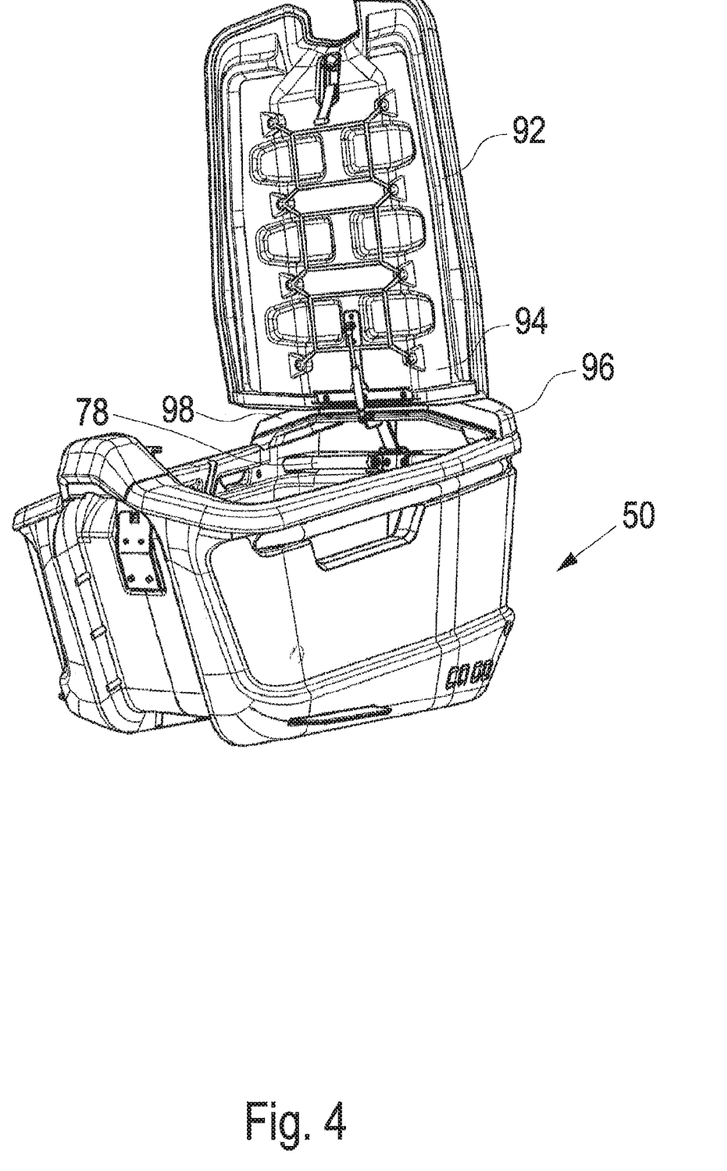
FIG. 4 shows a perspective view of a cargo accommodation container corresponding to FIG. 1 and comprising a cover.

In addition, it is possible to close the cargo bike transport carrier with a cover 92 (FIG. 4). The cover can be closed via a strap hinge 94 with a rest element 96 which rests upon an upper side of the transport carrier 50. The hinge 94 is connected to the connecting bracket 78 via a connecting element 98 such that, in particular during opening, the load and the weight of the cover 92 do not act upon the plastic transport carrier 50 but essentially upon the connecting element 78. Providing a cover on the cargo bike transport carrier and its connection to the connecting element 78 is an independent disclosure independent of the configuration of the cargo bike transport carrier itself. For instance, it can be made up of a plurality of parts or it can be formed integrally.

Irrespective of whether the transport carrier 50 comprises or does not comprise a cover 92, the front wall includes a deepened portion 99 extending into the transport carrier 50 in a direction opposite to the direction of travel. In this deepened portion 99 at least part of the fork elements 32 of the supporting elements 28 is arranged and fixed via a plate-shaped connecting element 100. The connecting element 100 in particular configured as a metal plate or the like is connected to the connecting bracket 78 such that any loads are directly transmitted between the connecting bracket 78 and the bike frame. The load transmitted to the transport carrier 50 made of plastic material is thus strongly reduced. The connecting bracket 78 may be arranged in recesses 79 or openings such that it does not protrude towards the outside of the cargo bike transport carrier.

Figure 5A:
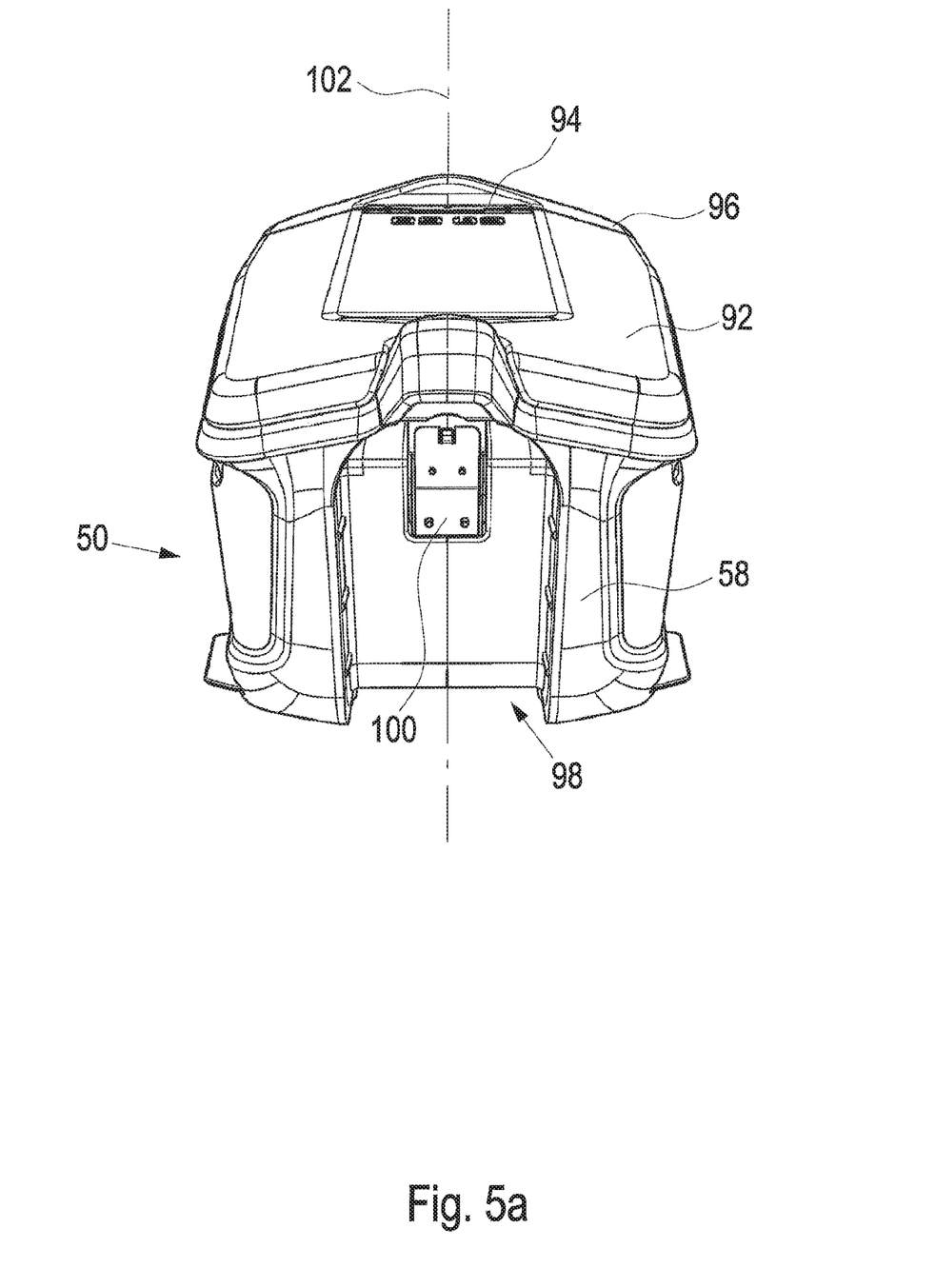
FIG. 5a and FIG. 5b show a perspective rear view of a cargo accommodation container with and without a cover.
Figure 5B:
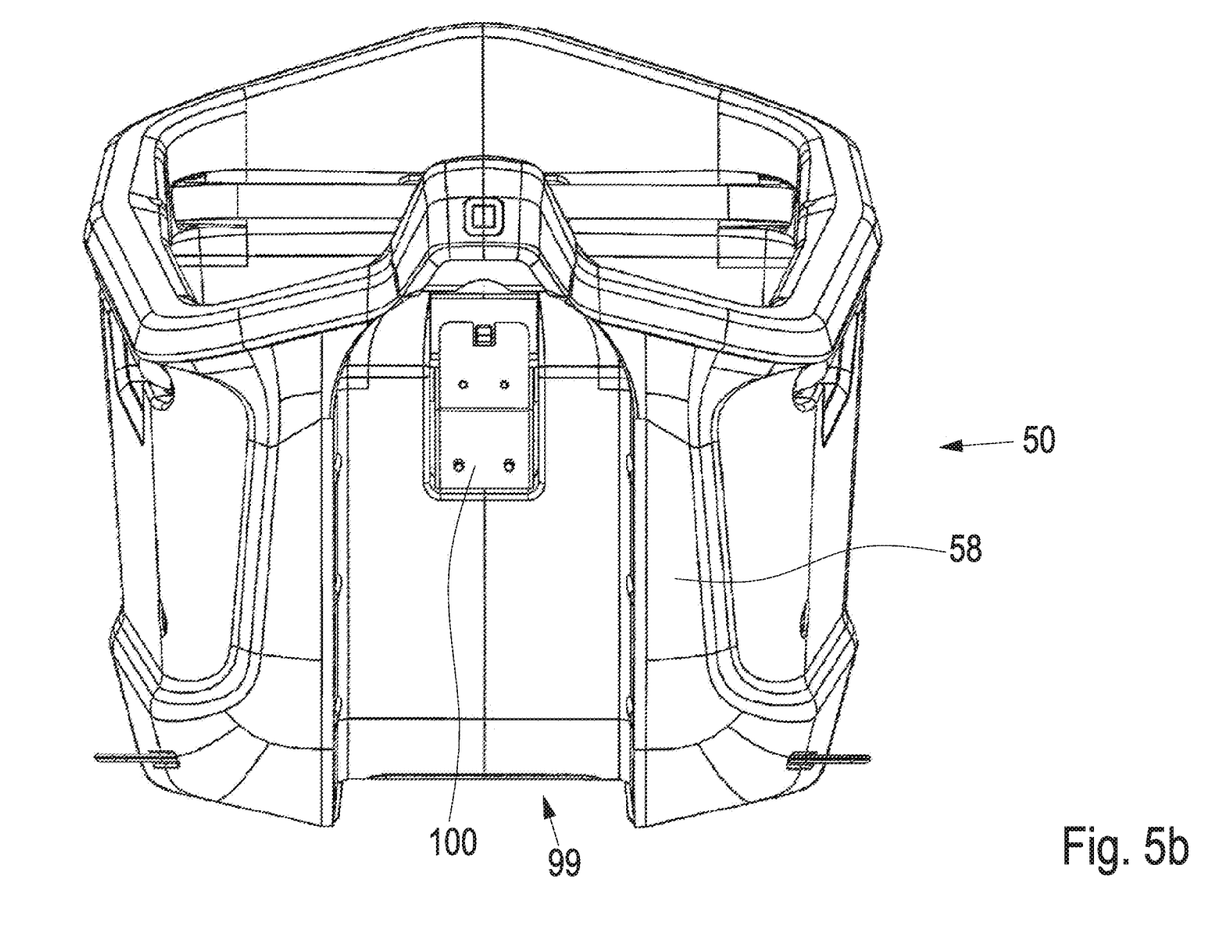

Independent of the cover 92 and the rest element 96, the transport carrier 50 is made up of two halves (FIG. 3), wherein, in the assembled condition, the parting plane 102 (FIGS. 5*a*-5*b*) coincides with the bike center plane.

Figure 7:
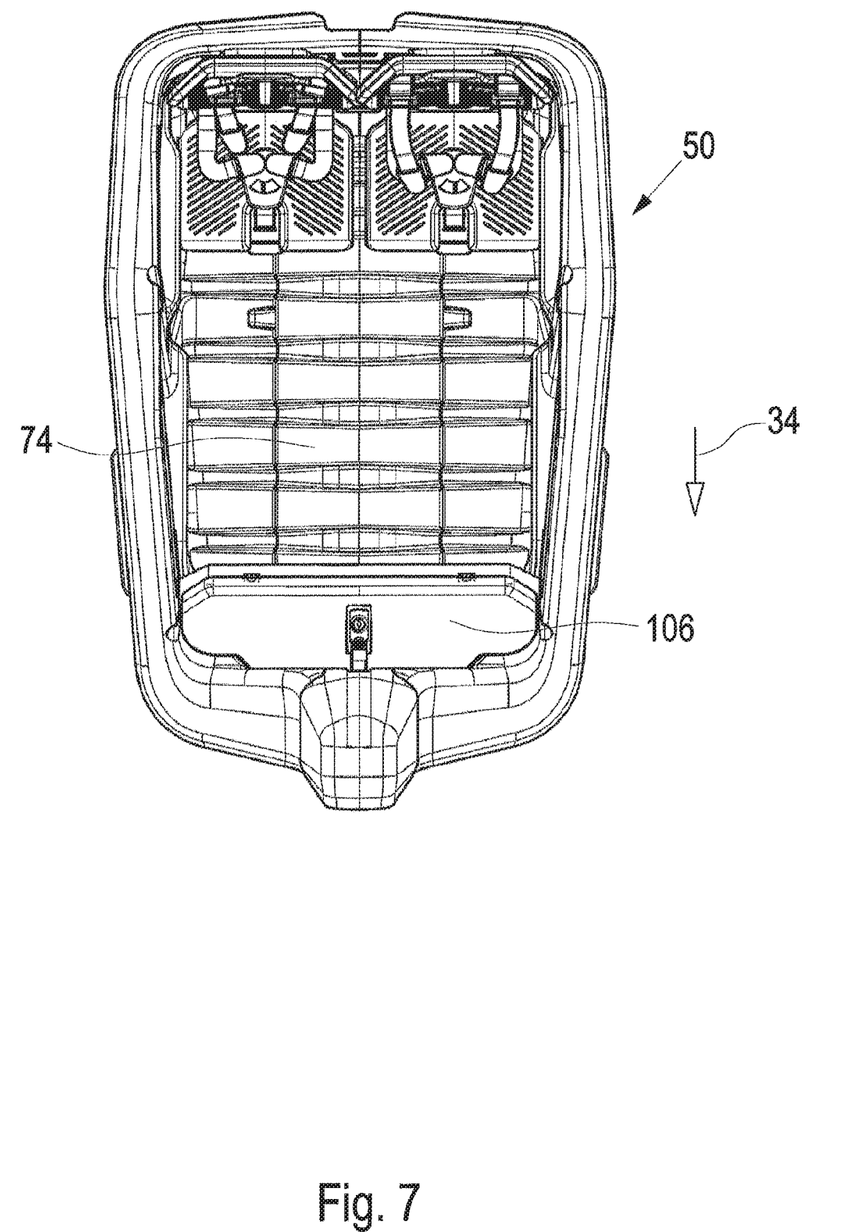
FIG. 7 shows a corresponding top view of the cargo accommodation container with integrated seats and an integrated storage box.

Inside the cargo bike transport carrier 50 not only cargo can be provided but also seats 104 for children (FIGS. 6*a*-6*b*), for example. Instead of a seat 104 arranged in the front as seen in the direction of travel 34, a storage compartment can be inserted into the transport carrier 50. The storage container 106 (FIG. 7) can be easily adjusted and/or suspended to the inside of the transport carrier between accommodation units.

The invention claimed is:

1. A cargo bike transport carrier, comprising
a bottom element,
two mutually opposite side walls,
a rear wall, and
a front wall,
wherein the cargo bike transport carrier comprises at least two plastic parts, wherein the first plastic part comprises at least one side wall and the second plastic part comprises at least the second side wall, and
characterized in that:
on the inside of the side walls, reinforcing ribs are provided, wherein the reinforcing ribs provide an armrest.

2. The cargo bike transport carrier according to claim 1, wherein the first or the second plastic part each comprise at least a portion of the bottom element or the rear wall or the front wall.

3. The cargo bike transport carrier according to claim 1, wherein the at least two plastic parts each comprise a portion of the bottom element or the front wall.

4. The cargo bike transport carrier according to claim 1, wherein the at least two plastic parts are of a mirror-inverted configuration.

5. The cargo bike transport carrier according to claim 1, wherein exactly two plastic parts are provided for forming the bottom part, the two side walls, the rear wall and the front wall.

6. The cargo bike transport carrier according to claim 1, wherein a direction of removal of the plastic parts from a mold is perpendicular to the side wall or in parallel to the rear wall or in parallel to the front wall or in parallel to the bottom wall, respectively.

7. The cargo bike transport carrier according to claim 1, wherein the at least two plastic parts are connected to each other via connecting elements, and wherein the connecting elements comprise a connecting bracket.

8. The cargo bike transport carrier according to claim 7, wherein the connecting bracket comprises two bracket elements which are connected to each other in a region of the rear wall and the front wall.

9. The cargo bike transport carrier according to claim 7, wherein the connecting bracket is arranged in a recess which is formed as a groove preferably open towards an outside in the side walls.

10. The cargo bike transport carrier according to claim 7, wherein the connecting elements comprise at least one connecting bar.

11. The cargo bike transport carrier according to claim 10, wherein one connecting bar is arranged on an inside of the rear wall or one connecting bar is arranged on an inside of the front wall.

12. The cargo bike transport carrier according to claim 10, wherein the at least one connecting bar extends between the side walls.

13. The cargo bike transport carrier according to claim 12, wherein the at least one connecting bar comprises releasable bosses at each end.

14. The cargo bike transport carrier according to claim 1, wherein for completely closing the cargo bike transport carrier a cover is provided.

15. The cargo bike transport carrier according to claim 14, wherein the cover is pivotably connected to a connecting element.

16. A cargo bike frame, comprising
a chain stay for accommodating a rear wheel,
a fork element for accommodating a front wheel, and
a supporting element for accommodating a cargo bike transport carrier according to claim 1 between a handlebar tube and the fork element,
wherein the supporting element further comprises two fork elements which extend upwards, wherein the two fork elements attach to a connecting element, such that any loads are directly transmitted to the bike frame.

17. The cargo bike transport carrier according to claim 1, wherein the reinforcing ribs are included on the inside of the bottom element.

18. The cargo bike transport carrier according to claim 17, wherein the one or more recesses are configured to hold goods during transport.

19. The cargo bike transport carrier according to claim 1, wherein the reinforcing ribs include one or more recesses, the one or more recesses being open towards the inside.

20. The cargo bike transport carrier according to claim 1, wherein the reinforcing ribs form grooves arranged in a pattern to improve rigidity.

* * * * *